US012591613B1

(12) United States Patent
Ritchie et al.

(10) Patent No.: US 12,591,613 B1
(45) Date of Patent: Mar. 31, 2026

(54) AUTOMATED TOPIC MODELLING AND VISUALIZATION BASED UPON SERVICE PHASE

(71) Applicant: Wells Fargo Bank, N.A., San Francisco, CA (US)

(72) Inventors: Misty Kay Ritchie, Cramerton, NC (US); Tyler Browning Goodman, Okemos, MI (US); Wei Wang, Media, PA (US); Stephen James Braje, Minneapolis, MN (US); Maryam Heidari Beisafar, Hoboken, NJ (US); Joseph Matthew Walter, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/663,101

(22) Filed: May 12, 2022

Related U.S. Application Data

(60) Provisional application No. 63/203,136, filed on Jul. 9, 2021.

(51) Int. Cl.
| | |
|---|---|
| *G06F 16/00* | (2019.01) |
| *G06F 16/3329* | (2025.01) |
| *G06F 16/334* | (2025.01) |
| *G06F 16/358* | (2025.01) |
| *G06N 3/04* | (2023.01) |

(52) U.S. Cl.
CPC ........ *G06F 16/358* (2019.01); *G06F 16/3329* (2019.01); *G06F 16/3344* (2019.01); *G06N 3/04* (2013.01)

(58) Field of Classification Search
CPC .............. G06F 16/358; G06F 16/3329; G06F 16/3344; G06N 3/04
USPC ........................................................ 707/739
See application file for complete search history.

(56) References Cited

U.S. PATENT DOCUMENTS

| | | | |
|---|---|---|---|
| 7,383,182 B2 * | 6/2008 | Taylor ................... | G10L 15/005 |
| | | | 704/E15.044 |
| 2013/0173257 A1 * | 7/2013 | Rose ...................... | G06F 40/284 |
| | | | 704/9 |
| 2019/0347668 A1 * | 11/2019 | Williams ............... | G06N 5/046 |
| 2021/0034994 A1 * | 2/2021 | Stocker ................. | G06F 16/283 |
| 2021/0232764 A1 * | 7/2021 | Bogdan ................. | G06F 16/355 |
| 2021/0343385 A1 * | 11/2021 | Jasik ...................... | G16H 20/70 |

(Continued)

OTHER PUBLICATIONS

Gallagher, Ryan, "Anchored Correlation Explanation: Topic Modeling with Minimal Domain Knowledge", arXiv:1611.10277v3 [cs.CL], (Dec. 4, 2017), 21 pgs.

*Primary Examiner* — Raquel Perez-Arroyo
(74) *Attorney, Agent, or Firm* — SCHWEGMAN LUNDBERG & WOESSNER, P.A.

(57) ABSTRACT

Disclosed in some examples are methods, systems, devices, and machine-readable mediums which create various data visualizations from a corpus of raw data collected from one or more sources. For example, natural language text documents of a corpus may be classified based upon the topic of the data. The documents may be labeled with the phase during which the documents were collected or observed. A visualization may then be generated which shows a correlation between the phase and the topics observed. For example, a number of times a particular topic appeared in a particular phase. The visualization may be two-dimensional, three-dimensional, or the like.

16 Claims, 7 Drawing Sheets

(56) References Cited

U.S. PATENT DOCUMENTS

| | | | |
|---|---|---|---|
| 2021/0382944 A1* | 12/2021 | Li | ........................... G06F 16/35 |
| 2022/0309250 A1* | 9/2022 | Das | ........................ G06N 3/08 |

* cited by examiner

*FIG. 5*

AUTOMATED TOPIC MODELLING AND VISUALIZATION BASED UPON SERVICE PHASE

PRIORITY CLAIM

This patent application claims the benefit of priority, under 35 U.S.C. Section 119 to U.S. Provisional Patent Application Ser. No. 63/203,136, entitled "Automated Topic Modelling and Visualizations," filed on Jul. 9, 2021, which is hereby incorporated by reference herein in its entirety.

TECHNICAL FIELD

Embodiments pertain to automated processing of documents using machine learning. Some embodiments relate to producing automated visualizations of processed documents.

BACKGROUND

The proliferation of network-based services has also led to an explosion in the amount of data available for analysis. For example, one estimate is that almost 300 million posts per day are created on a single popular social media site. Much of this data is time sensitive as it reflects sentiments and opinions that are temporal in nature.

Understanding rich data sets and contextualizing those data sets remains a challenge for organizations that rely upon the interpretation and understanding of those data sets to provide their own network services. For example, organizations may rely upon those interpretations to make further data-driven changes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates a first example visualization according to some examples of the present disclosure.

DETAILED DESCRIPTION

Figure 1:
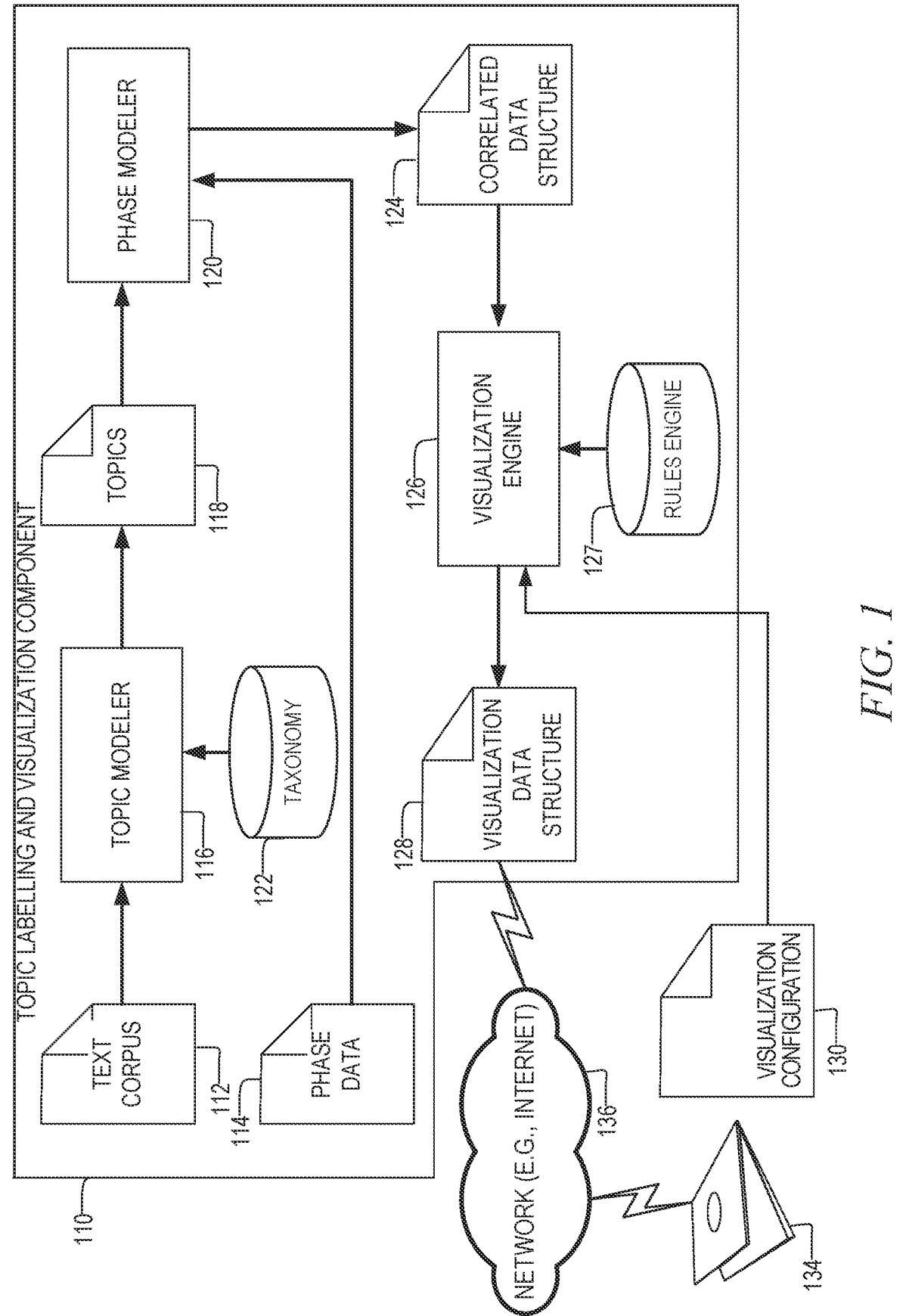
FIG. 1 illustrates an environment of a topic labelling and visualization system according to some examples of the present disclosure.

As noted above, the explosion in raw data created is both an issue and an opportunity for organizations that rely upon this data. On the one hand, it has never been easier for individuals to provide data on services offered by an organization. On the other hand, this ease results in a flood of data that needs to be parsed and analyzed in order to gain the benefit of the information. As noted, this data (e.g., feedback) is often time sensitive. Since this data may be unstructured free-text, automated analysis is difficult. In addition, the data may be difficult to correlate to a particular phase in the network-based service provider's service delivery, which further complicates efforts to contextualize the data.

Disclosed in some examples are methods, systems, devices, and machine-readable mediums which create various data visualizations from a corpus of raw data collected from one or more sources. For example, natural language text documents of a corpus may be classified based upon the topic of the data. The documents may be labeled with the phase during which the documents were collected or observed. The phase may be a phase of a user's use of a network-based service. A visualization may then be generated which shows a correlation between the phase and the topics observed. For example, a number of times a particular topic appeared in a particular phase. The visualization may be two-dimensional, three-dimensional, or the like.

In some examples, the documents may correspond to discrete submissions of natural language text created and/or submitted by a user, such as a user's comment about a network-based service, a social media comment, a transcript of a user's phone call (the transcript being done either live or based upon a recording), or the like. A document may be an email, electronic transcript, letter, chat conversation, electronic survey response, voice file, internet form submission, social networking post, short message, text message, instant message, or the like. The topics may be identified in each document using topic clustering, such as by using a Latent Dirichlet Allocation (LDA) method, a Correlation Explanation (CorEx) method, a recurrent neural network (RNN), or the like. CorEx is a model described by "Anchored Correlation Explanation: Topic Modeling with Minimal Domain Knowledge," by Ryan J. Gallagher, Kyle Reing, David Kale, and Greg Ver Steeg, arXiv: 1611.10277v3 [cs.CL] 4 Dec. 2017.

In some examples, the topic clusters are words from the documents that cluster together as a result of the topic clustering algorithm. The topic clusters may then be labelled based upon a defined taxonomy, the label may be considered the "topic" of a particular document. The taxonomy may be defined manually, and in some examples may be predefined. In some examples, the topic clusters may be manually labelled with items from the taxonomy.

In other examples, the system may automatically label topic clusters with items in the taxonomy. For example, based upon similarity of the taxonomy items to the words in the topic clusters. In these examples, the taxonomy items may be added as documents to the topic clustering analysis. One or more of the taxonomy items may then be clustered, by the clustering algorithm, with a cluster of tokens. A cluster of tokens having associated taxonomy items in that cluster may be labeled based upon those taxonomy items. For example, if a token cluster has the tokens: "stolen," "money missing" "unauthorized" and "fraud," where "fraud" is a taxonomy item, the cluster may be labelled as referring to the topic of "fraud." In instances where multiple taxonomy items are clustered in a same cluster the cluster may be labelled as both items or an administrator may determine which of the two taxonomy items is used to label the cluster.

Another example automatically labelling may use a set of predetermined associated keywords in addition to, or instead of the taxonomy items themselves. That is, each item of the taxonomy may have keywords or phrases (e.g., such as synonyms) that are related to that taxonomy item. Topic clusters with keywords or phrases matching the keywords or phrases associated with a particular taxonomy item may be labelled with that particular taxonomy item.

In yet additional examples, the keywords associated with the taxonomy item may be included as one or more documents in the topic clustering analysis. The clusters may then be labelled based upon which keywords from the taxonomy items are placed in the cluster as a result of the topic clustering algorithm. For example, if the cluster includes three keywords from taxonomy item 1 and one keyword from taxonomy item 2, the cluster may be labelled as corresponding to taxonomy item 1. In some examples, the keywords may be removed from the cluster analysis for further processing.

In some examples, the phase of the network-based service in which the text data was generated may be labelled by the system when it is received. For example, when a document is received, the system may cross-reference a data structure of an account of a user and determine the phase of the service in which the user is currently part of. The document may then be labelled (e.g., tagged) according to the phase. In other examples, the system may use one or more machine-learning algorithms to assign the phase. For example, a classification algorithm, a CorEx algorithm, a LDA analysis of the text, or the like. In some examples, the document may include verbiage regarding which phase the user is currently part of. This verbiage may be added by either the user or the system.

In other examples, the topics present in a particular document and the phase label may be fed back into the particular document or may be associated with the document (e.g., in a database). The topic and phase label may then be accessible by systems reading and/or utilizing the document. For example, a customer service representative may be able to identify the topic of one or more previous conversations with other customer service representatives without having to read each transcript. In addition, the system may be used on live transcripts that identify topic and phase as the representative is discussing the issue with the user to assist the representative. The topic and phase may be used to automatically search for and display, on the representative's computing device information related to the topic and phase to assist the representative in solving issues related to the topic and phase. In another example, customer contact information (transcript, email, survey feedback) may be combined with transactional (e.g., Automated Teller Machine (ATM), payment or purchase activity) and inter-actional data (e.g., Voice Response Unit (VRU) or website activity) to provide data on the user experience to provide insight on what the user was trying to do and what problems they might have encountered during that interaction.

In some examples, the network-based service may be one or more services provided in whole, or in part, using computerized technology over a network such as the Inter-net. For example, file sharing and storage services, resource management services, processing services, and the like. Example resources may include computing resources, memory resources, storage resources, currency, and the like. For example, a network-based banking service.

The disclosure herein thus solves various technical problems such as that of understanding massive amounts of potentially time sensitive data in a short amount of time using technical solutions of using automated topic classification and phase tagging. In some examples, this allows for technical diagnosis of technical problems of a network-based service faster-which leads to a reduction in resource usage (processing cycles, network traffic, power, and the like) of clients attempting to use the network-based service and failing, a reduction in resources used by potentially non-functional or compromised network-based resources, and the like. In other examples, this also allows for optimizations that reduce resource usage through increased efficiencies through streamlined user interfaces, functionality, and the like.

FIG. 1 illustrates an environment of a topic labelling and visualization system according to some examples of the present disclosure. Topic labelling and visualization component 110 may identify text corpus 112. For example, one or more documents submitted by users of the network-based service, documents including transcripts of conversations where a user is a party, and the like. The text corpus 112 may be identified from a database, one or more computing systems, a transcript of a conversation, or the like. Topic modeler 116 uses the documents in the text corpus to produce a list of one or more topics 118 contained in each of the documents in the text corpus 112. In some examples, the topic modeler is an LDA model, CorEx model, in other examples, the topic modeler is a RNN. In some examples, as already noted, the topic modeler 116 may use a taxonomy 122 to label to the word clusters corresponding to topics.

Phase modeler 120 may utilize phase data 114 and the topics 118 to apply phase tags to the documents to identify at which phase of providing a network-based service during which the document was generated. The phase tags may be identified based upon where the document in the text corpus 112 was generated. For example, if the text corpus was generated during a particular operation and the operation may have an associated phase, the phase may be passed into the phase modeler 120 as phase data 114. Likewise, if the document was generated by a particular user account, the phase may be determined from information within the user account. The account information may be part of the phase data 114. For example, the phase may be determined based upon one or more of: the information in the account (e.g., an account status), what information is in the account, what information is not in the account, and the like.

In some examples, the phase modeler 120 may utilize CorEx, LDA, RNN, or other classification algorithms to determine the phase from the natural language text in the text corpus 112 (e.g., the document) itself. For example, contextual hints or clues may be embedded within the text. For example, a user may write "I'm having trouble creating an account," which may indicate a topic of "account creation" and a phase of "onboarding." In other examples, various systems may include metadata which may also be used to classify the phase. Phases may be selected from plurality of phases indicated by phase data 114. For example, a phase taxonomy. The phase modeler 120 may be a same component as the topic modeler 116 in these examples, or may be a separate component. That is, the algorithm of the topic modeler (CorEx, LDA, RNN) may be a same or different model as the phase modeler 120. In some examples, the phase tags are created during the topic modelling performed by topic modeler 116.

Phase modeler 120 may produce a correlated data structure 124 that correlates two or more of the topics, phases, and/or documents. For example, by counting and storing the incidence of occurrence of each of the topics within each phase.

The visualization engine 126 may transform the correlated data structure 124 into one or more visualization data structures 128. In some examples, the visualization engine may convert the correlated data structure 124 into visualization data structure 128 using one or more rules from the rules engine 127 and visualization settings from the visualization configuration 130. Visualization configuration 130 may be set by a client computing device 134, an administrator, or the like. In some examples, the rules engine 127 may have one or more template visualization data structures 128, and the correlated data structure 124 may be used to fill in values in the template.

Visualization data structure 128 may be one or more data structures and may be transmitted through a network 136 to a client computing device 134 for display by the client computing device 134. Visualization data structure 128 may be or include one or more data structures and may be in the form of one or more HyperText Markup Language (HTML) files, extensible Markup Language (XML), scripting files (e.g., JavaScript), code modules or components, Cascading Style Sheets (CSS), or the like. The visualization data structure 128 may be displayed in a browser or other application of the client computing device 134.

In some examples, the correlated data structure 124 may be used to update one or more documents within the text corpus 112, such as by tagging the topics detected within the document. In other examples, other documents may be tagged. For example, a user account for a user (or files associated with the user account) for which the document in the text corpus 112 corresponds to may be updated to indicate the documents and the topics of those documents.

Figure 2:
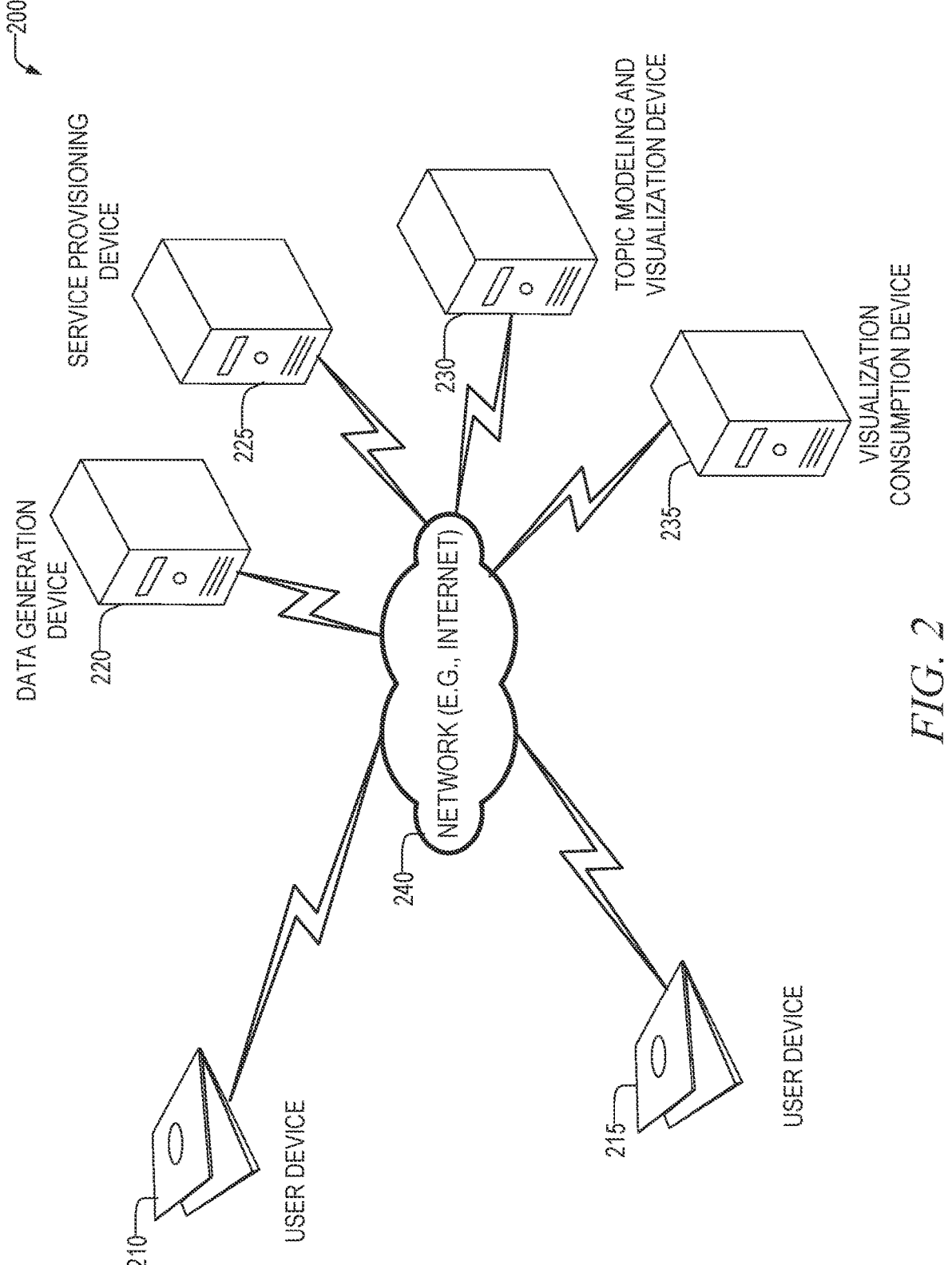
FIG. 2 illustrates an environment for topic modelling and visualization of a text corpus according to some examples of the present disclosure.

FIG. 2 illustrates an environment 200 for topic modelling and visualization of a text corpus according to some examples of the present disclosure User devices 210 and 215 use network 240 to interact with a service provisioning device 225 to obtain network-based services. For example, by sending files and other data between the user devices 210 and 215 and the service provisioning device 225. During the course of providing services, the user devices 210 and 215 may encounter one or more difficulties in accessing the network-based services. These difficulties may result in the submission, by the user devices 210 and/or 215, of one or more documents. These documents may be submitted, in some examples, to a data generation device 220. Data generation device 220 may be part of the network-based service provided by the service provisioning device, or may be a different service, such as a social media service. In other examples, the documents may be initially generated by the data generation device 220 as part of a transcription of a phone call from a user of the user device 215 or 210 to a communications node (e.g., a call center) of the network-based service.

Topic modeling and visualization device 230 may receive these documents as a document corpus—for example, as text corpus 112 of FIG. 1, and produce a visualization configuration 130. The documents may be received using an API, screen scraping, or the like. In some examples, the topic modeling and visualization device 230 may include a topic labelling and visualization component, such as topic labelling and visualization component 110 of FIG. 1. The visualization data structure produced by the topic modeling and visualization device may be sent through the network 240 to one or more of user device 210, 215; or may be sent to the visualization consumption device 235. Visualization consumption device 235 may be a server, an administrator, or the like.

Figure 3:
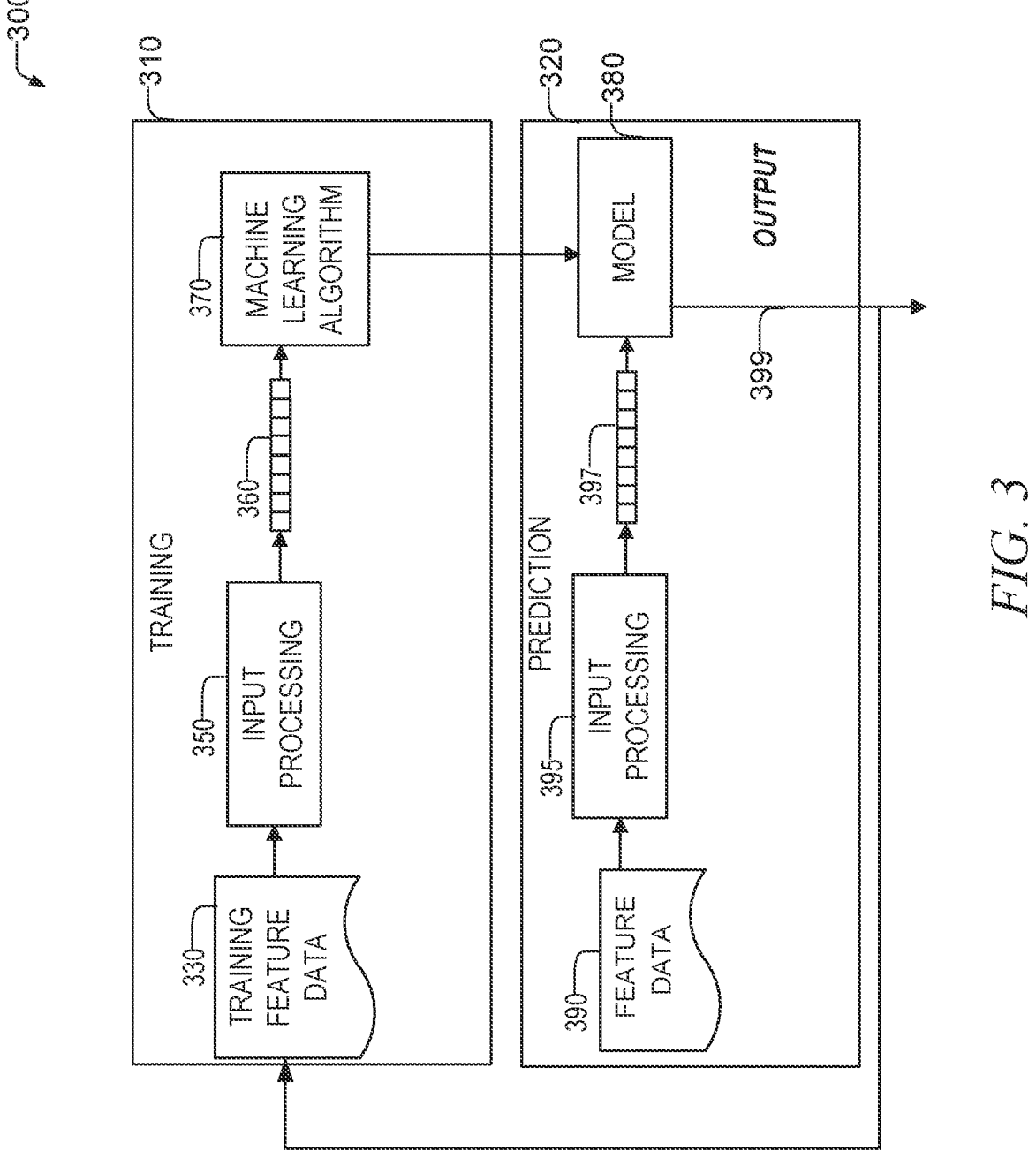
FIG. 3 illustrates an example machine learning component according to some examples of the present disclosure.

In some examples, machine learning may be used to identify topics, label the topics based upon phase, and the like. FIG. 3 illustrates an example machine learning component 300 according to some examples of the present disclosure. The machine learning component 300 may be implemented in whole or in part by one or more computing devices—for example as software configuring one or more processors. In some examples, the training component 310 may be implemented by a different device than the prediction component 320. In these examples, the model 380 may be created on a first machine and then sent to a second machine. One or more of components 310 and 320 may be implemented by the topic modeler 116 and/or the phase modeler 120 of FIG. 1.

Machine learning component 300 utilizes a training component 310 and a prediction component 320. Training component 310 inputs training feature data 330 into input processing component 350. The training feature data 330 may include a training corpus of documents. The training feature data 330 may be labeled with topics or phases depending on the use of the machine-learning model. In other examples, the training data may not be labeled, and the model may be trained using feedback data—such as through a reinforcement learning method.

Input processing component 350 may filter out data from the training feature data 330 that is not predictive of a result. For example, if the goal of the model 380 is to predict a topic of a natural language document, and if the training feature data 330 is natural language input, the input processing component 350 may filter out tokens (words) that are not predictive of a topic—such as articles and other common words that do not convey useful information to determining a topic. In other examples, the input processing component 350 may perform one or more operations on the training feature data 330 to prepare the data in the training feature data 330 for processing by the machine learning algorithm 370. Example operations may include data smoothing, conversions, mapping from one quantity to another, putting the data into one or more data structures, and the like.

The input processing component may output processed training data 360. The processed training data 360 may comprise a set of processed training feature data 330. Information chosen for inclusion in the processed training data 360 may be all the training feature data 330 or in some examples, may be a subset of all the training feature data 330. The processed training data 360 may be utilized (along with any applicable labels) by the machine learning algorithm 370 to produce a model 380. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected. In some examples, models may be trained repetitively or recursively by applying the outputs of the model back as inputs and maximizing or minimizing some quantity by adjusting the parameters of the model and then repeating until a defined metric is satisfied.

In the prediction component 320, data 390 may be input to the input processing component 395. The data 390 includes a corpus of documents such as descriptions of a network-based service (e.g., complaints, problems, and the like), social network data, log data, and the like. Input processing component 395 may operate the same, or differently than input processing component 350. In some examples, input processing components 350 and 395 are the same components or different instances of the same component. Input processing component 395 produces processed feature data 397, which is input into the model 380 to produce an output such as an identification of topics and/or phases 399. For example, the weightings and/or network structure learned by the training component 310 may be executed on the processed feature data 397 by applying processed feature data 397 to a first layer of the model 380 to produce inputs to a second layer of the model 380, and so on until the output is reached.

The training component 310 may operate in an offline manner to train the model 380. The prediction component 320, however, may be designed to operate in an online manner. It should be noted that the model 380 may be periodically updated via additional training and/or user feedback. For example, additional training feature data 330 may be collected as users provide feedback on the output. The feedback, along with the data 390 corresponding to that feedback, may be used to refine the model by the training component 310. In some examples, the identification of topics, and/or phases 399 may be used as feedback to retrain and refine the model 380.

The machine learning algorithm 370 may be selected from among many different supervised or unsupervised machine learning algorithms. Examples of machine learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, LDA models, CorEx, hidden Markov models, expectation-maximization algorithms, vector quantization, and information bottleneck method.

Figure 4:
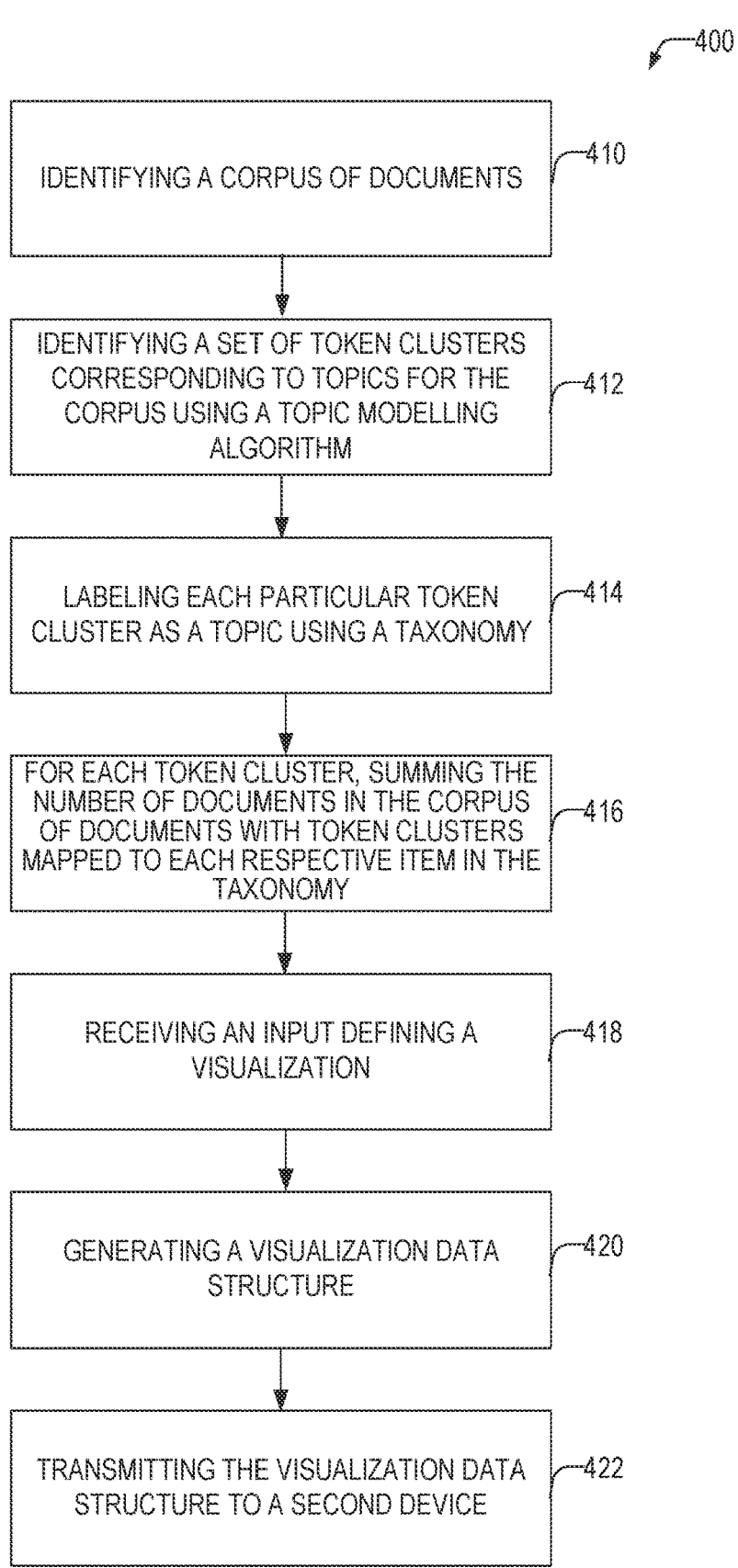
FIG. 4 illustrates a flowchart of a method of producing a graphical interface according to some examples of the present disclosure.

FIG. 4 illustrates a flowchart of a method 400 of producing a graphical interface according to some examples of the present disclosure. At operation 410 the system may identify a corpus of documents. For example, the documents may comprise a natural language description corresponding to services provided by a network-based service. For example, complaints, feedback, or the like. The documents may be submitted in text form; converted to text form (e.g., by a voice recognition process); or the like Each submission may be considered a document. For example, a user may type complaints, feedback, or other comments in a web-form and click a submit button. The comments submitted may be considered a document. Later, the same user may submit new comments. These comments may be considered a separate document in the corpus. Documents may be identified from a database, through an API, through scraping of an external web-based service (e.g., a social networking service) or the like.

At operation 412, the system may identify a set of topic clusters corresponding to topics for the corpus using a topic modelling algorithm. For example, using a LDA, CorEx, RNN, or other algorithm. The clusters may comprise a number of tokens (e.g., words) from the corpus that have a high probability (e.g., a top x number of tokens, or tokens with a probability above a threshold) of relating to a particular topic. For example, an LDA algorithm, is used to discover the topics that occur within a document, transcript, email or chatbot conversation and clusters words into topics based on the probabilistic relationship of words-maximizing similarities within a topic cluster and maximizing differences between topic clusters. Each word in the corpus is randomly assigned to one of k topics. The system then repetitively updates the probability of each word in the corpus belonging to a particular topic t as p(topic t|document d)*p(word w|topic t). The quantity p(topic t|document d) determines bow likely a document belongs to the topic based upon the topics assigned to the words in the document d. That is, the more words that belong to topic t in document d, the higher this probability. The quantity p(word w|topic t) quantifies the importance of a particular word w to the topic t—that is, how many documents are in topic t because of word w. This process may be repeated until a number of words or other tokens form a topic cluster. Note that the topic cluster is not currently labeled.

CorEx is an information-theoretic principle for learning abstract representations that are maximally informative about the data. This approach is based on a series of results demonstrating how the information in complex (high-dimensional) systems can be modularly and hierarchically decomposed and can leverage anchor words to increase the precision of the data predictions.

In some examples, if the topic model is an RNN, the system may continually learn from additional data and add clusters to the framework automatically.

At operation 414, the system may label the topic clusters based upon a defined taxonomy. For example, as previously described. The labels may be applied automatically. For example, a machine learning algorithm, such as shown in FIG. 3. The taxonomy may be defined manually. The system may assign topic clusters to items in the taxonomy based upon similarity of the taxonomy item to the words in the topic clusters. For example, items in the taxonomy, or defined keywords associated with each item of the taxonomy, may be added to the topic cluster analysis and the taxonomy items and/or keywords that fall within clusters may be identified and used to label the clusters. In still other examples, one or more example documents may be modified so as to include one or more taxonomy items corresponding to manually determined topics in the document. When the topic clustering or other algorithm completes, the output may cluster taxonomy items with other words. The cluster may be identified as a topic corresponding to the taxonomy items within those clusters.

At operation 416, the number of documents for which each topic appears may be summed, ordered or otherwise selected to identify a main or primary topic. For example, each document may have one or more topics associated with it. The number of documents for each topic, or the number of topics for each document may be determined.

At operation 418, the system may receive an input defining a visualization. For example, a user may select a type of visualization (e.g., 2D or 3D), the data to show on each axis, a scale, labels for the axis, and the like. At operation 420, the system may generate a visualization data structure based upon the input defining the visualization, the plurality of items in the taxonomy, the sum of the number of documents in the corpus of documents with topic clusters mapped to each respective item in the taxonomy, and based upon tags for each document in the corpus of documents identifying a service phase during which the document was generated. For example, the phase of each document may be determined using a machine-learning model, manual tagging of documents, or automatic tagging of documents based upon either where in the network-based service the document was generated or based upon data in a user profile of a user that created the document. Tags for phase and tags for topics may be matrixed to create an intersection of customer phase and topic to create the visualization. The visualization data structure may be created using rules from a rules engine. The rules may specify how to convert a correlated data structure into a visualization data structure. Visualization data structure may include one or more HTML, CSS, JavaScript, scripting files, executable modules, or the like.

At operation 422, the system may transmit the visualization data structure to a second computing device, the second computing device displaying a visualization corresponding to the visualization data structure. The data structure may be executed, interpreted, or used by a computing device to provide the selected visualization.

Figure 5:
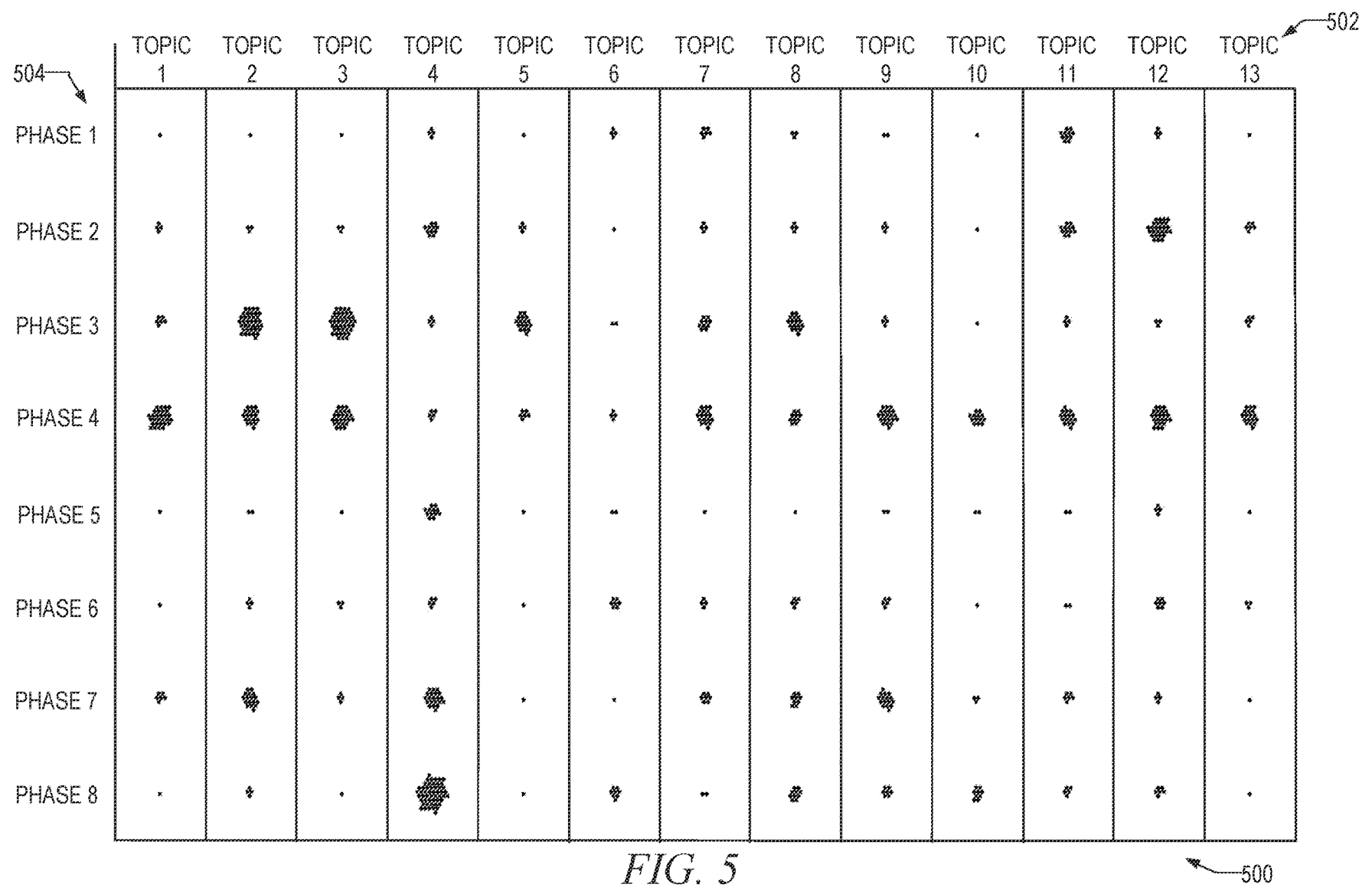

FIG. 5 illustrates a first example visualization 500 according to some examples of the present disclosure. Visualization 500 is a two-dimensional visualization. Phases 504 are represented as rows and topics are represented as columns 502. At each intersection of phase and topic, the number of documents for that phase and that topic are represented by dots. The more dots, the more documents that were determined to relate to that phase and topic. For example, phase 3 and topic 3 have a large number of corresponding documents. Whereas phase 1 and topic 13 have very few.

Figure 6:
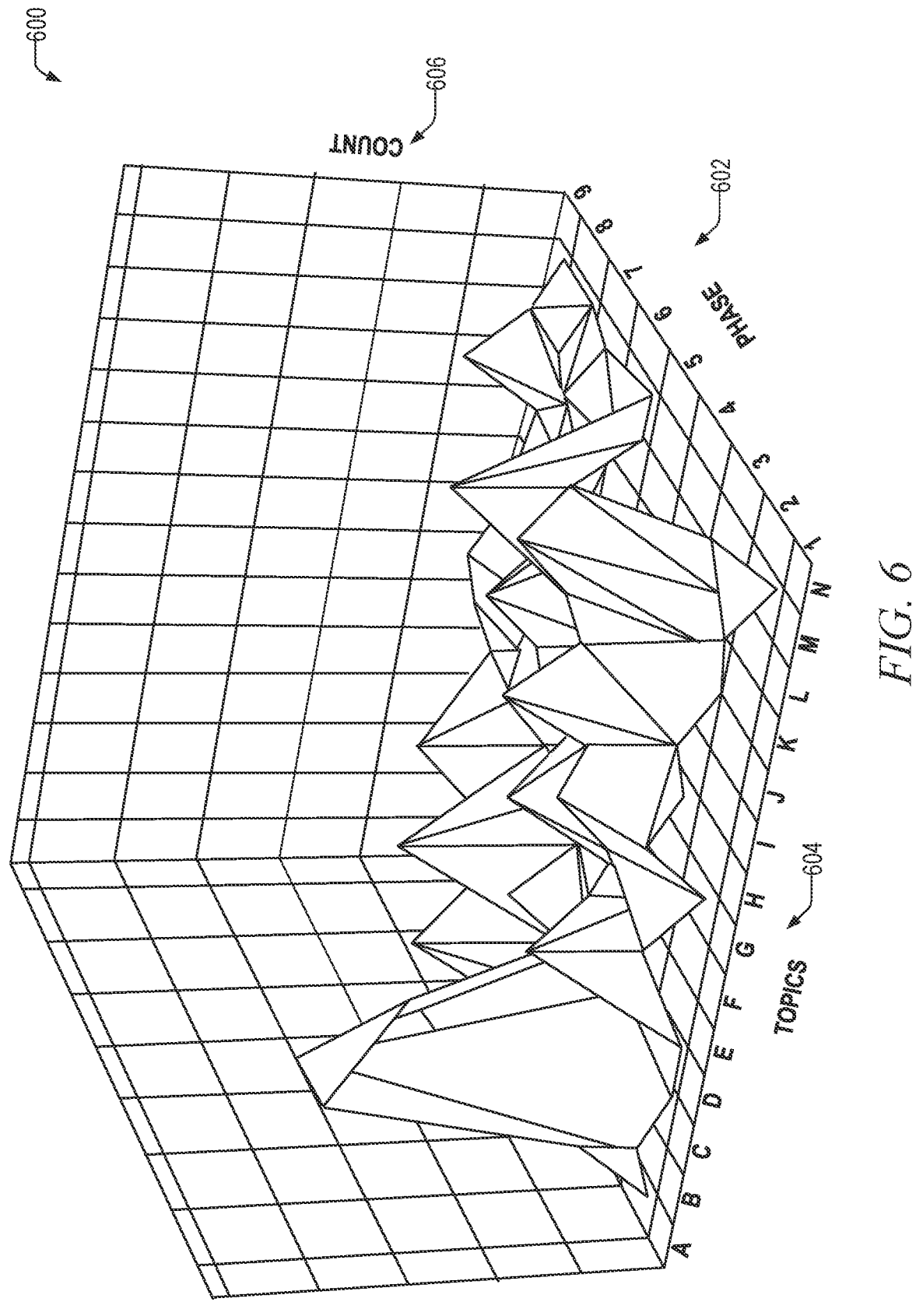
FIG. 6 illustrates a second example visualization according to some examples of the present disclosure.

FIG. 6 illustrates a second example visualization 600 according to some examples of the present disclosure. Visualization 600 is a three-dimensional visualization. Phases 602 are shown on a first axis, topics 604 are shown on a second axis, and the count of the documents for each topic and phase may be a third axis 606.

Other example visualizations include heat maps where the number of documents is represented by a color, a topographical map with lines closer together to indicate numerosity.

The foregoing data (e.g., categorization and tagging of phases) and visualizations may be used in a variety of manners. For example, the visualizations may assist in troubleshooting systems issues. If a high number of documents relate to a particular topic and a particular phase, it may indicate that the system is down or not functioning smoothly. The visualizations may also help with data driven prioritizations of improvement projects for the network-based service. That is, projects may be prioritized (manually or automatically) that address areas with a high number of topics from the corpus (e.g., a high number of complaints). For example, projects may be tagged with phase and/or topics and those that correlate to topics and/or phases with a high number of associated documents may be automatically prioritized over other projects that do not correlate to topics and/or phases with a high number of associated documents.

The data may also be used to find emerging trends such as issues with the computing devices, local events, and the like. Additionally, the data may be used to find issues with processes and procedures, new products, technological trends or failures, and the like. This data may be used to automatically take corrective action such as alerting administrators, rebooting machines, and the like. For example, if a particular topic is correlated to more than a threshold number of documents over a predetermined period of time, an automatic action may be taken. For example, one or more defined computing devices may be checked (e.g., for a heartbeat) and rebooted if the machine is not functioning properly. In some examples, a correlation at any intersection of phase and topic may create an alert to an administrator for assessment. It may also be used in reporting to process owners to prioritize corrective actions or improvement opportunities. In other examples, an alert may be automatically generated to a technology team if there is a spike in issues associated with customers unable to complete actions on a digital platform (corporate websites).

As previously described, the topics may be fed back into the documents for later use—such as by an employee for later conversations with a user associated with the document. In some examples, a document comprising a real-time transcript of a call may be classified with phase and topic in real time as the user is talking with an agent and the information fed back to the agent in real-time. In still other examples, the topic and phase may be used to route a call to a correct agent according to the agent's specialty and the topic and phase.

In some examples, phase may be a customer interaction point, such as a customer journey. Example phases include withdrawing money at an ATM, opening an account at a banking center, paying a bill on mobile banking, and the like. In this manner the present disclosure may provide a customer experience topographic map by applying machine learning techniques.

In some examples, the data, e.g., the correlated data structure 124 and/or the visualization data structure 128 may be transmitted over a network (e.g., network 136), and stored in a database for later accessing and/or later conversion to reports including matrixes, 2D or 3D representations of the data.

Figure 7:
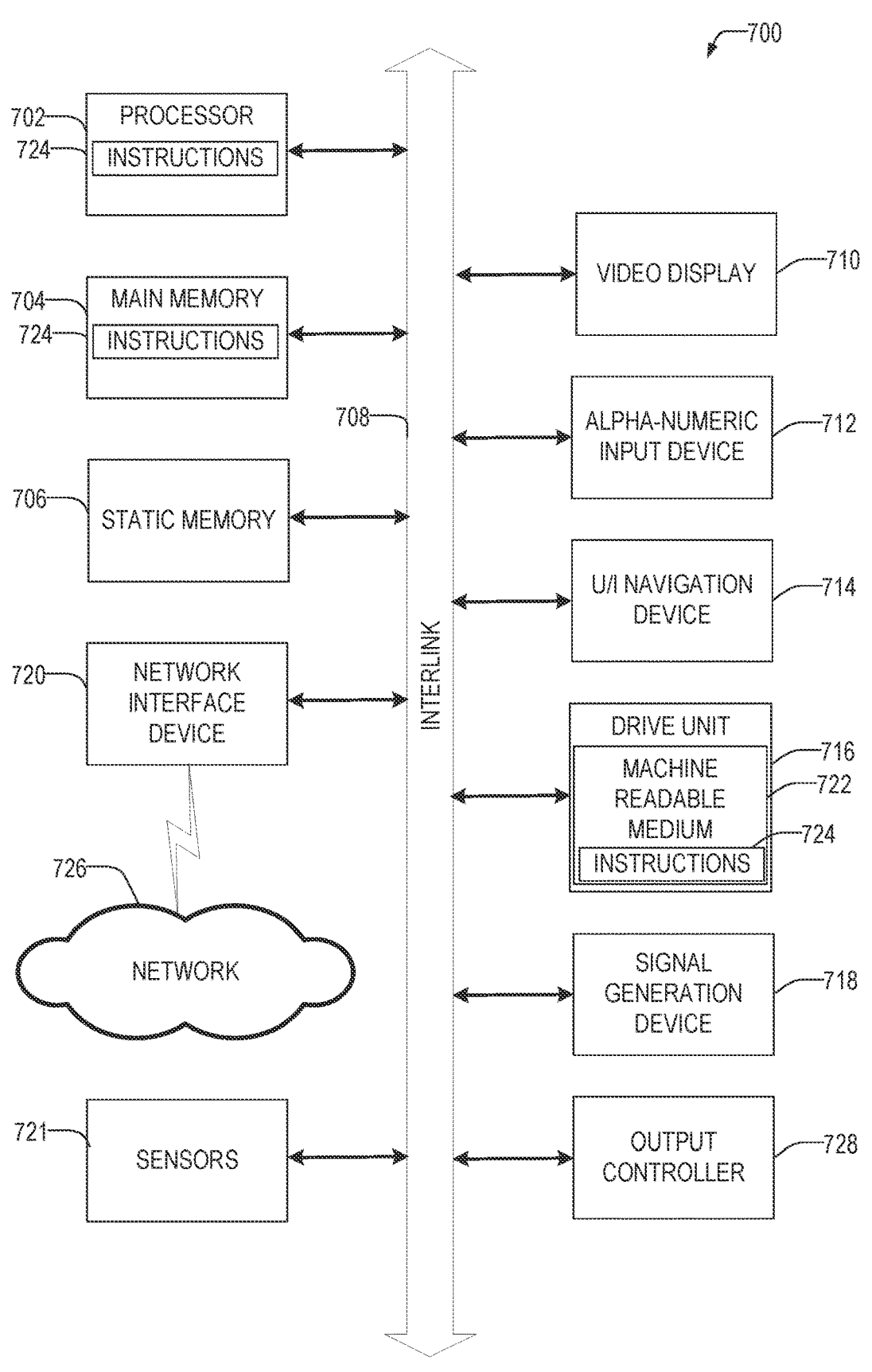
FIG. 7 illustrates a block diagram of an example machine upon which any one or more of the techniques (e.g., methodologies) discussed herein may be performed.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be in the form of a personal computer (PC), a tablet PC, a set-top box (STB), a personal digital assistant (PDA), a mobile telephone, a smart phone, a web appliance, a network router, server, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 700 may be configured to implement the topic labelling and visualization component 110, the client computing device 134, components of network 136, user device 210, user device 215, data generation device 220, service provisioning device 225, topic modelling and visualization device 230, visualization consumption device 235, machine learning component 300, the method 400, visualization 500 and visualization 600.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 700 may include one or more hardware processors, such as processor 702. Processor 702 may be a central processing unit (CPU), a graphics processing unit (GPU), a hardware processor core, or any combination thereof. Machine 700 may include a main memory 704 and a static memory 706, some or all of which may communicate with each other via an interlink (e.g., bus) 708. Examples of main memory 704 may include Synchronous Dynamic Random-Access Memory (SDRAM), such as Double Data Rate memory, such as DDR4 or DDR5. Interlink 708 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a SG New Radio (NR) family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Other Notes and Examples

Example 1 is a method for producing a graphical user interface, the method comprising: at a first computing device, using one or more processors: identifying a corpus of documents comprising natural language descriptions of services provided by a network-based service provider, identifying a set of topic clusters corresponding to topics for the corpus using a topic modelling algorithm; mapping each particular token cluster in the set of topic clusters to a topic from a defined taxonomy with a plurality of items; for each token cluster, summing a number of documents in the corpus of documents with topic clusters mapped to each respective item in the taxonomy; receiving input defining a visualization; generating a visualization data structure based upon the input defining the visualization, the plurality of items in the taxonomy, the sum of the number of documents in the corpus of documents with topic clusters mapped to each respective item in the taxonomy, and based upon tags for each document in the corpus of documents identifying a service phase during which the document was generated; and transmitting the visualization data structure to a second computing device, the second computing device displaying a visualization corresponding to the visualization data structure.

In Example 2, the subject matter of Example 1 includes, wherein the visualization comprises a map illustrating the number of documents in the corpus that are mapped to each combination of service phase and item in the taxonomy.

In Example 3, the subject matter of Example 2 includes, wherein the visualization is a three dimensional illustration, wherein the number of documents in the corpus is a first dimension, the service phase is a second dimension, and the item in the taxonomy is a third dimension.

In Example 4, the subject matter of Examples 1-3 includes, wherein identifying a corpus of documents comprising natural language descriptions of services provided by a network-based service provider comprises transcribing a live or recorded conversation.

In Example 5, the subject matter of Examples 1-4 includes, wherein the modelling algorithm is a Latent Dirichlet Allocation (LDA).

In Example 6, the subject matter of Examples 1-5 includes, wherein the modelling algorithm is a Recurrent Neural Network (RNN).

In Example 7, the subject matter of Examples 1-6 includes, wherein the modelling algorithm is a Correlation Explanation algorithm.

In Example 8, the subject matter of Examples 1-7 includes, updating a first document of the corpus of documents with a tag identifying the corresponding item in the taxonomy.

In Example 9, the subject matter of Examples 1-8 includes, identifying the service phase for each document in the corpus based upon language in the document and the modelling algorithm.

Example 10 is a device for producing a graphical user interface, the device comprising: a processor; a memory, the memory including instructions, which when executed by the processor, causes the device to perform operations comprising: identifying a corpus of documents comprising natural language descriptions of services provided by a network-based service provider; identifying a set of topic clusters corresponding to topics for the corpus using a topic modelling algorithm; mapping each particular token cluster in the set of topic clusters to a topic from a defined taxonomy with a plurality of items; for each token cluster, summing a number of documents in the corpus of documents with topic clusters mapped to each respective item in the taxonomy; receiving input defining a visualization; generating a visualization data structure based upon the input defining the visualization, the plurality of items in the taxonomy, the sum of the number of documents in the corpus of documents with topic clusters mapped to each respective item in the taxonomy, and based upon tags for each document in the corpus of documents identifying a service phase during which the document was generated; and transmitting the visualization data structure to a second computing device, the second computing device displaying a visualization corresponding to the visualization data structure.

In Example 11, the subject matter of Example 10 includes, wherein the visualization comprises a map illustrating the number of documents in the corpus that are mapped to each combination of service phase and item in the taxonomy.

In Example 12, the subject matter of Example 11 includes, wherein the visualization is a three dimensional illustration, wherein the number of documents in the corpus is a first dimension, the service phase is a second dimension, and the item in the taxonomy is a third dimension.

In Example 13, the subject matter of Examples 10-12 includes, wherein the operations of identifying a corpus of documents comprising natural language descriptions of services provided by a network-based service provider comprises transcribing a live or recorded conversation.

In Example 14, the subject matter of Examples 10-13 includes, wherein the modelling algorithm is a Latent Dirichlet Allocation (LDA).

In Example 15, the subject matter of Examples 10-14 includes, wherein the modelling algorithm is a Recurrent Neural Network (RNN).

In Example 16, the subject matter of Examples 10-15 includes, wherein the modelling algorithm is a Correlation Explanation algorithm.

In Example 17, the subject matter of Examples 10-16 includes, wherein the operations further comprise: updating a first document of the corpus of documents with a tag identifying the corresponding item in the taxonomy.

In Example 18, the subject matter of Examples 10-17 includes, wherein the operations further comprise: identifying the service phase for each document in the corpus based upon language in the document and the modelling algorithm.

Example 19 is a non-transitory machine-readable medium, storing instructions, which when executed by a machine, causes the machine to perform operations comprising: identifying a corpus of documents comprising natural language descriptions of services provided by a network-based service provider; identifying a set of topic clusters corresponding to topics for the corpus using a topic modelling algorithm; mapping each particular token cluster in the set of topic clusters to a topic from a defined taxonomy with a plurality of items; for each token cluster, summing a number of documents in the corpus of documents with topic clusters mapped to each respective item in the taxonomy; receiving input defining a visualization; generating a visualization data structure based upon the input defining the visualization, the plurality of items in the taxonomy, the sum of the number of documents in the corpus of documents with topic clusters mapped to each respective item in the taxonomy, and based upon tags for each document in the corpus of documents identifying a service phase during which the document was generated; and transmitting the visualization data structure to a second computing device, the second computing device displaying a visualization corresponding to the visualization data structure.

In Example 20, the subject matter of Example 19 includes, wherein the visualization comprises a map illustrating the number of documents in the corpus that are mapped to each combination of service phase and item in the taxonomy.

In Example 21, the subject matter of Example 20 includes, wherein the visualization is a three dimensional illustration, wherein the number of documents in the corpus is a first dimension, the service phase is a second dimension, and the item in the taxonomy is a third dimension.

In Example 22, the subject matter of Examples 19-21 includes, wherein the operations of identifying a corpus of documents comprising natural language descriptions of services provided by a network-based service provider comprises transcribing a live or recorded conversation.

In Example 23, the subject matter of Examples 19-22 includes, wherein the modelling algorithm is a Latent Dirichlet Allocation (LDA).

In Example 24, the subject matter of Examples 19-23 includes, wherein the modelling algorithm is a Recurrent Neural Network (RNN).

In Example 25, the subject matter of Examples 19-24 includes, wherein the modelling algorithm is a Correlation Explanation algorithm.

In Example 26, the subject matter of Examples 19-25 includes, wherein the operations further comprise: updating a first document of the corpus of documents with a tag identifying the corresponding item in the taxonomy.

In Example 27, the subject matter of Examples 19-26 includes, wherein the operations further comprise: identifying the service phase for each document in the corpus based upon language in the document and the modelling algorithm.

Example 28 is a device for producing a graphical user interface, the device comprising: means for identifying a corpus of documents comprising natural language descriptions of services provided by a network-based service provider; means for identifying a set of topic clusters corresponding to topics for the corpus using a topic modelling algorithm; means for mapping each particular token cluster in the set of topic clusters to a topic from a defined taxonomy with a plurality of items; for each token cluster, means for summing a number of documents in the corpus of documents with topic clusters mapped to each respective item in the taxonomy, means for receiving input defining a visualization; means for generating a visualization data structure based upon the input defining the visualization, the plurality of items in the taxonomy, the sum of the number of documents in the corpus of documents with topic clusters mapped to each respective item in the taxonomy, and based upon tags for each document in the corpus of documents identifying a service phase during which the document was generated; and means for transmitting the visualization data structure to a second computing device, the second computing device displaying a visualization corresponding to the visualization data structure.

In Example 29, the subject matter of Example 28 includes, wherein the visualization comprises a map illustrating the number of documents in the corpus that are mapped to each combination of service phase and item in the taxonomy.

In Example 30, the subject matter of Example 29 includes, wherein the visualization is a three dimensional illustration, wherein the number of documents in the corpus is a first dimension, the service phase is a second dimension, and the item in the taxonomy is a third dimension.

In Example 31, the subject matter of Examples 28-30 includes, wherein identifying a corpus of documents comprising natural language descriptions of services provided by a network-based service provider comprises transcribing a live or recorded conversation.

In Example 32, the subject matter of Examples 28-31 includes, wherein the modelling algorithm is a Latent Dirichlet Allocation (LDA).

In Example 33, the subject matter of Examples 28-32 includes, wherein the modelling algorithm is a Recurrent Neural Network (RNN).

In Example 34, the subject matter of Examples 28-33 includes, wherein the modelling algorithm is a Correlation Explanation algorithm.

In Example 35, the subject matter of Examples 28-34 includes, means for updating a first document of the corpus of documents with a tag identifying the corresponding item in the taxonomy.

In Example 36, the subject matter of Examples 28-35 includes, means for identifying the service phase for each document in the corpus based upon language in the document and the modelling algorithm.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

What is claimed is:

1. A method for producing a graphical user interface, the method comprising:

at a first computing device, using one or more processors:

identifying a corpus of documents comprising natural language descriptions of services provided by a network-based service provider, for each particular document, identifying one of a plurality of service phases during which the particular document was collected, the service phase determined based upon a phase of an account data structure of a particular user to which the particular document relates, a service phase being a stage in the particular user's account lifecycle related to the particular user's use of a network-based service, the corpus of documents comprising postings on a social media platform;

identifying a set of topic clusters corresponding to topics for the corpus using a neural network topic clustering algorithm, each topic cluster in the set of topic clusters comprising words from the corpus of documents that cluster together as a result of the topic clustering algorithm;

automatically assigning a topic label to each particular topic cluster in the set of topic clusters based upon a similarity measure between words in the particular topic cluster and predefined topics in a taxonomy;

calculating a number of documents in each particular topic cluster in the set of topic clusters that are identified as having come from each phase of the plurality of service phases, to produce service phase data;

receiving input defining rules from a rules engine specifying conversion of the service phase data to a visualization;

generating a visualization data structure based upon the rules from the rules engine and the service phase data, the generating comprising:

applying one or more rules from the rules engine to convert the service phase data into the visualization data structure, the one or more rules comprising one or more templates for visualization;

incorporating visualization settings from a visualization configuration into the visualization data structure, the visualization configuration being set by a client computing device;

producing the visualization data structure in a format for display by the client computing device; and transmitting the visualization data structure to a second computing device, the second computing device displaying a visualization corresponding to the visualization data structure, the visualization displaying the service phase data as part of a graphical user interface.

2. The method of claim 1, wherein the visualization comprises a map illustrating the number of documents in the corpus that are mapped to each combination of service phase and item in the taxonomy.

3. The method of claim 2, wherein the visualization is a three dimensional illustration, wherein the number of documents in the corpus is a first dimension, the service phase is a second dimension, and the item in the taxonomy is a third dimension.

4. The method of claim 1, wherein identifying a corpus of documents comprising natural language descriptions of services provided by a network-based service provider comprises transcribing a live or recorded conversation.

5. The method of claim 1, wherein the neural network is a Recurrent Neural Network (RNN).

6. The method of claim 1, further comprising:

updating a first document of the corpus of documents with a tag identifying a corresponding topic label.

7. The method of claim 1, further comprising:

identifying the service phase for each document in the corpus based upon language in the document.

8. A device for producing a graphical user interface, the device comprising:

a processor;

a memory, the memory including instructions, which when executed by the processor, causes the device to perform operations comprising:

identifying a corpus of documents comprising natural language descriptions of services provided by a network-based service provider, for each particular document, identifying one of a plurality of service phases during which the particular document was collected, the service phase determined based upon a phase of an account data structure of a particular user to which the particular document relates, a service phase being a stage in the particular user's account lifecycle related to the particular user's use of a network-based service, the corpus of documents comprising postings on a social media platform;

identifying a set of topic clusters corresponding to topics for the corpus using a neural network topic clustering algorithm, each topic cluster in the set of topic clusters comprising words from the corpus of documents that cluster together as a result of the neural network topic clustering algorithm;

automatically assigning a topic label to each particular topic cluster in the set of topic clusters based upon a similarity measure between words in the particular topic cluster and predefined topics in a taxonomy;

calculating a number of documents in each particular topic cluster in the set of topic clusters that are identified as having come from each phase of the plurality of service phases, to produce service phase data;

receiving input defining rules from a rules engine specifying conversion of the service phase data to a visualization;

generating a visualization data structure based upon the rules from the rules engine and the service phase data, the generating comprising:

applying one or more rules from the rules engine to convert the service phase data into the visualization data structure, the one or more rules comprising one or more templates for visualization;

incorporating visualization settings from a visualization configuration into the visualization data structure, the visualization configuration being set by a client computing device;

producing the visualization data structure in a format for display by the client computing device; and transmitting the visualization data structure to a second computing device, the second computing device displaying a visualization corresponding to the visualization data structure, the visualization displaying the service phase data as part of a graphical user interface.

9. The device of claim 8, wherein the visualization comprises a map illustrating the number of documents in the corpus that are mapped to each combination of service phase and item in the taxonomy.

10. The device of claim 9, wherein the visualization is a three dimensional illustration, wherein the number of documents in the corpus is a first dimension, the service phase is a second dimension, and the item in the taxonomy is a third dimension.

11. The device of claim 8, wherein the operations of identifying a corpus of documents comprising natural language descriptions of services provided by a network-based service provider comprises transcribing a live or recorded conversation.

12. The device of claim 8, wherein the neural network is a Recurrent Neural Network (RNN).

13. The device of claim 8, wherein the operations further comprise:

updating a first document of the corpus of documents with a tag identifying a corresponding topic label.

14. The device of claim 8, wherein the operations further comprise:

identifying the service phase for each document in the corpus based upon language in the document.

15. A non-transitory machine-readable medium, storing instructions, which when executed by a machine, causes the machine to perform operations comprising:

identifying a corpus of documents comprising natural language descriptions of services provided by a network-based service provider, for each particular document, identifying one of a plurality of service phases during which the particular document was collected, the service phase determined based upon a phase of an account data structure of a particular user to which the particular document relates, a service phase being a stage in the particular user's account lifecycle related to the particular user's use of a network-based service, the corpus of documents comprising postings on a social media platform;

identifying a set of topic clusters corresponding to topics for the corpus using a neural network topic clustering algorithm, each topic cluster in the set of topic clusters comprising words from the corpus of documents that cluster together as a result of the topic clustering algorithm;

automatically assigning a topic label to each particular topic cluster in the set of topic clusters based upon a similarity measure between words in the particular topic cluster and predefined topics in a taxonomy;

calculating a number of documents in each particular topic cluster in the set of topic clusters that are identified as having come from each phase of the plurality of service phases, to produce service phase data;

receiving input defining rules from a rules engine speci-
fying conversion of the service phase data to a visual-
ization;

generating a visualization data structure based upon the
rules from the rules engine and the service phase data,
the generating comprising:

applying one or more rules from the rules engine to
convert the service phase data into the visualization
data structure, the one or more rules comprising one or
more templates for visualization;

incorporating visualization settings from a visualization
configuration into the visualization data structure, the
visualization configuration being set by a client com-
puting device;

producing the visualization data structure in a format for
display by the client computing device; and transmitting the visualization data structure to a second
computing device, the second computing device dis-
playing a visualization corresponding to the visualiza-
tion data structure, the visualization displaying the
service phase data as part of a graphical user interface.

16. The non-transitory machine-readable medium of
claim 15, wherein the visualization comprises a map illus-
trating the number of documents in the corpus that are
mapped to each combination of service phase and item in the
taxonomy.

* * * * *